(12) United States Patent
Xiong et al.

(10) Patent No.: US 9,026,430 B2
(45) Date of Patent: May 5, 2015

(54) ELECTRONIC DEVICE AND NATURAL LANGUAGE ANALYSIS METHOD THEREOF

(71) Applicants: Fu Tai Hua Industry (Shenzhen) Co., Ltd., Shenzhen (CN); Hon Hai Precision Industry Co., Ltd., New Taipei (TW)

(72) Inventors: Yu-Kai Xiong, Shenzhen (CN); Xin Lu, Shenzhen (CN); Shih-Fang Wong, New Taipei (TW); Hui-Feng Liu, Shenzhen (CN); Dong-Sheng Lv, Shenzhen (CN); Yu-Yong Zhang, Shenzhen (CN); Jian-Jian Zhu, Shenzhen (CN); Xiang-Lin Cheng, Shenzhen (CN); Xuan-Fen Huang, Shenzhen (CN); An-Lin Jiang, Shenzhen (CN); Xiao-Shan Zhou, Shenzhen (CN); Xin-Hua Li, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 247 days.

(21) Appl. No.: 13/710,481

(22) Filed: Dec. 11, 2012

(65) Prior Publication Data
US 2013/0173252 A1    Jul. 4, 2013

(30) Foreign Application Priority Data
Dec. 30, 2011    (CN) .......................... 2011 1 0451460

(51) Int. Cl.
G06F 17/27    (2006.01)
G06F 17/28    (2006.01)
(52) U.S. Cl.
CPC ............ G06F 17/28 (2013.01); G06F 17/2715 (2013.01)

(58) Field of Classification Search
USPC ....................................... 704/9, 257
See application file for complete search history.

(56) References Cited

U.S. PATENT DOCUMENTS

| 7,003,457 B2* | 2/2006 | Halonen et al. ............... 704/235 |
| 7,788,099 B2* | 8/2010 | Haubold et al. .............. 704/270 |
| 2012/0166180 A1* | 6/2012 | Au .................................... 704/9 |
| 2012/0173574 A1* | 7/2012 | Homma et al. ............... 707/772 |

* cited by examiner

Primary Examiner — Abul Azad
(74) Attorney, Agent, or Firm — Novak Druce Connolly Bove + Quigg LLP

(57) ABSTRACT

A language analysis method for an electronic device storing a basic corpus and a temporary corpus is provided. The language analysis method includes steps of receiving user inputs and generating signals; converting signals into textualized information; analyzing the textualized information; obtaining a first understanding result according to the basic corpus, the vocabulary segmentation results, and the sentence segmentation results; determining whether the first understanding result is an appropriate understanding according to the context; determining one or more anaphoric vocabularies when the first understanding result is an inappropriate understanding; determining a temporary understanding result of the one or more anaphoric vocabularies and a second understanding result of the textualized information according to the context; and determining a reply for the textualized information, according to the second understanding result, the basic corpus, and the temporary corpus. An electronic device using the language analysis method is also provided.

20 Claims, 2 Drawing Sheets

ELECTRONIC DEVICE AND NATURAL LANGUAGE ANALYSIS METHOD THEREOF

BACKGROUND

1. Technical Field

The present disclosure relates to an electronic device and a natural language analysis method thereof.

2. Description of Related Art

Electronic devices with human-machine dialogue function, such as mobile phones, laptops, and tablets, are capable of interactively talking to users. How to exactly understand the natural language of users has been the challenge in artificial intelligence discipline for a long time period. During the human-machine dialogue process, the electronic device segments a sentence spoken by a user into pieces of words and/or phrases, analyzes the meanings of the sentence to exclude unreasonable meaning(s), then creates machine readable language such as binary language, that is based on the sentence of the user. The electronic device then understands the sentence of the user by using the created machine readable language and a basic dictionary pre-stored therein, to obtain the meanings of the sentence of the user. Although the base dictionary includes language knowledge and grammar knowledge, we often use an expression, such as a word, or a phrase, to take the place of another expression, even when the two expressions have different word classes and/or different meanings. Thus, misunderstandings often happen because of these substitutions in human language, especially for the Chinese.

Therefore, what is needed is an electronic device and a natural language analysis method thereof to alleviate the limitations described above.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding sections throughout the several views.

DETAILED DESCRIPTION

Figure 1:
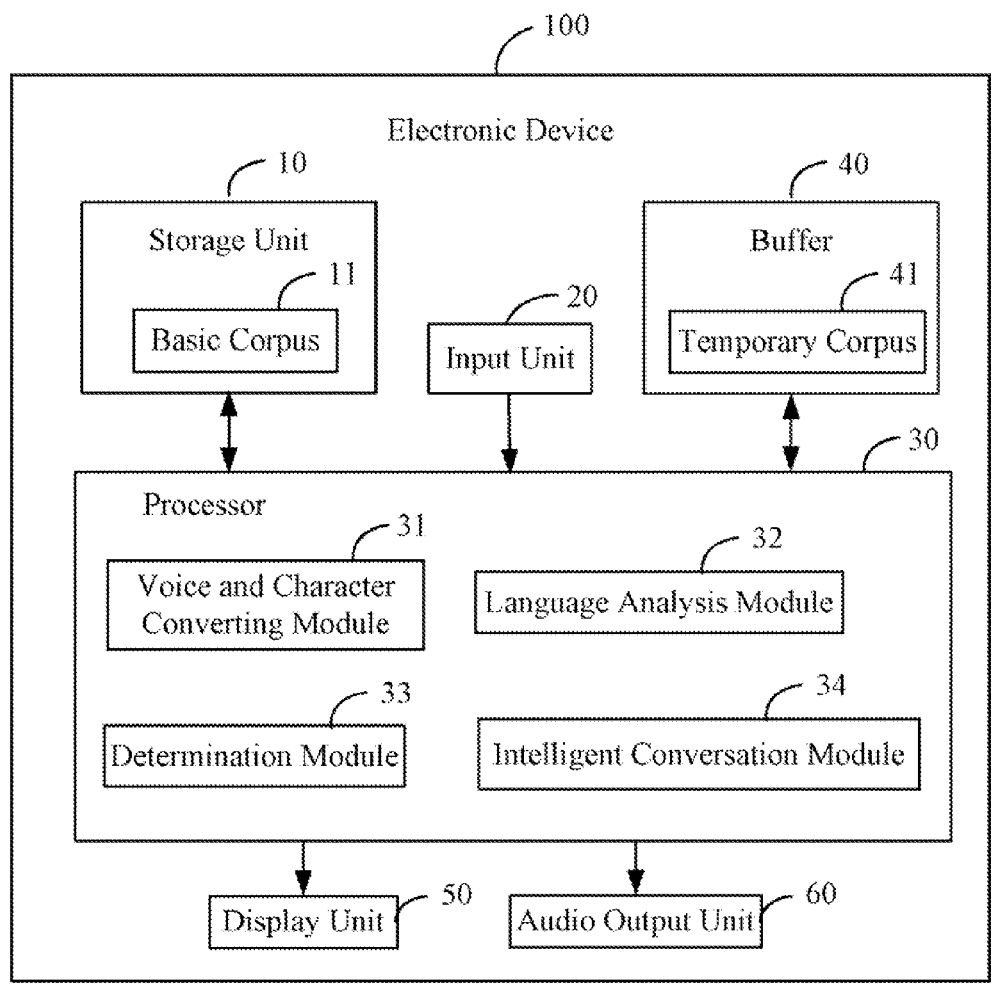
FIG. 1 is a block diagram of an electronic device in accordance with an exemplary embodiment.

FIG. 1 is an exemplary embodiment of a block diagram of an electronic device 100. The electronic device 100 can more accurately understand the language of users, and has a higher efficiency in translating human-machine dialogues. The electronic device 100 is a computing device such as a computer or a laptop. In alternative embodiments, the electronic device 100 can be other electronic devices with human-machine dialogue functions, such as a mobile phone, or a tablet, for example.

The electronic device 100 includes a storage unit 10, an input unit 20, a processor 30, a buffer 40, a display unit 50, and an audio output unit 60. The storage unit 10 stores a collection of dictionaries and other linguistic sources in one body (basic corpus 11) recording a vast amount of vocabularies, words and phrases, and the frequency of use of each word and each phrase. The basic corpus 11 is a collection of language use material which is selected and sequenced according to linguistic criterium. The basic corpus 11 is also a huge text database which is machine readable and is collected according to a given design criterium. In the embodiment, the basic corpus 11 is a text database storing a huge amount of Chinese natural language. In other embodiments, the text database of the languages stored in the basic corpus 11 can be varied according to need, the basic corpus 11 can be a text database storing a huge amount of the natural language of English, and of Japanese, for example.

The buffer 40 stores a temporary corpus 41 recording a mapping relationship between at least one substitute vocabulary and at least one temporary meaning. The temporary corpus 41 is collected during the human-machine dialogue process of the electronic device 100. The temporary corpus 41 may record for example the temporary meaning "eat in the canteen" associated with the substitute vocabulary "eat canteen". In an alternative embodiment, the temporary corpus 41 is stored in the storage unit 10.

The input unit 20 generates signals in response to a user's spoken voice and/or written character input, and transmits the signals to the processor 30. In the embodiment, the signals can be audio data (audio signals) and/or data concerning written characters (character signals).

The processor 30 includes a voice and character converting module 31, a language analysis module 32, a determination module 33, and an intelligent conversation module 34. When the electronic device 100 is powered on, the input unit 20 is activated and the user can talk to and give commands to the electronic device 100 via the input unit 20.

The voice and character converting module 31 converts the audio signals and/or character signals from the input unit 20 into a textualized message in a predetermined language. In the embodiment, the textualized message can include one or more words, one or more phrases, one or more sentences, and/or one or more paragraphs of text, and the predetermined language is Chinese. In an alternative embodiment, the predetermined language can be English, or Japanese, or some other language.

The language analysis module 32 firstly segments the textualized message converted by the voice and character converting module 31 into one or more vocabularies, and obtains one or more vocabularized segments including the one or more vocabularies. Then the language analysis module 32 applies a sentence construction rule to the vocabularized segments of the textualized message, and obtains one or more sentence segments. The language analysis module 32 further retrieves the frequency of use of each segmented vocabulary, from the basic corpus 11, to obtain a first language understanding result of the textualized message by analyzing the one or more vocabularized segments and the one or more sentence segments, based on the retrieved frequency of use of each segmented vocabulary. The language analysis module 32 also transmits the first language understanding result to the determination module 33.

The determination module 33 analyzes a number of selected textualized messages converted within a predetermined time period, and including the original textualized message using a contextual understanding method, so as to determine whether the first language understanding result is a reasonable understanding, and transmits the determined result to the language analysis module 32 and the intelligent conversation module 34.

If the determination module 33 determines the first language understanding result is a reasonable understanding, the intelligent conversation module 34 determines a reply message for the textualized message of the user based on the first language understanding result and the basic corpus 11.

If the determination module 33 determines that the first language understanding result is an unreasonable understanding, the determination module 33 further determines one or more vocabularies which give rise to an unreasonable understanding. The determined vocabularies are substitute vocabularies. The determination module 33 also compares the determined substitute vocabularies with the substitute vocabularies recorded in the temporary corpus 41, to determine whether the temporary corpus 41 does have a record of the determined substitute vocabularies.

If the temporary corpus 41 does not have a record of one or more of the determined substitute vocabularies, the language analysis module 32 further determines the temporary meaning of each determined substitute vocabulary not recognized in the temporary corpus 41 by analyzing the context, including the determined substitute vocabulary, thus to obtain a second understanding result of the textualized message. The language analysis module 32 also updates the temporary corpus 41 by storing the mapping relationship between the determined substitute vocabularies and the temporary meaning. The intelligent conversation module 34 then determines a message to reply to the textualized message (reply message) based on the second language understanding result, the updated temporary corpus 41, and the basic corpus 11.

If the temporary corpus 41 does have a record of all of the determined substitute vocabularies, the language analysis module 32 retrieves the temporary meaning of each determined substitute vocabulary from the temporary corpus 41, and determines a third understanding of the textualized message. The intelligent conversation module 34 then determines a reply message based on the third language understanding result, the temporary corpus 41, and the basic corpus 11.

The voice and character converting module 31 further converts the reply message determined by the intelligent conversation module 34 into a textualized reply message and/or voice signals, and controls the display unit 50 to display the textualized reply message and/or the audio output unit 60 to playback the message vocally.

The buffer 40 further stores data temporarily, namely, the textualized reply message converted by the voice and character converting module 31, the vocabularies and the vocabularized segments and the sentence segments segmented by the language analysis module 32, and the first, second, and third understanding results obtained by the language analysis module 32.

In an embodiment, when both the buffer 40 and the storage unit 10 fail to store a temporary corpus 41, the determination module 33 further creates a temporary corpus 41 and stores a mapping relationship between the determined substitute vocabularies and the temporary meaning in the created temporary corpus 41. The determination module 33 further deletes the temporary corpus 41 stored in the buffer 40 and/or the storage unit 10, when the current human-machine dialogue between the electronic device 100 and the user is over.

Figure 2:
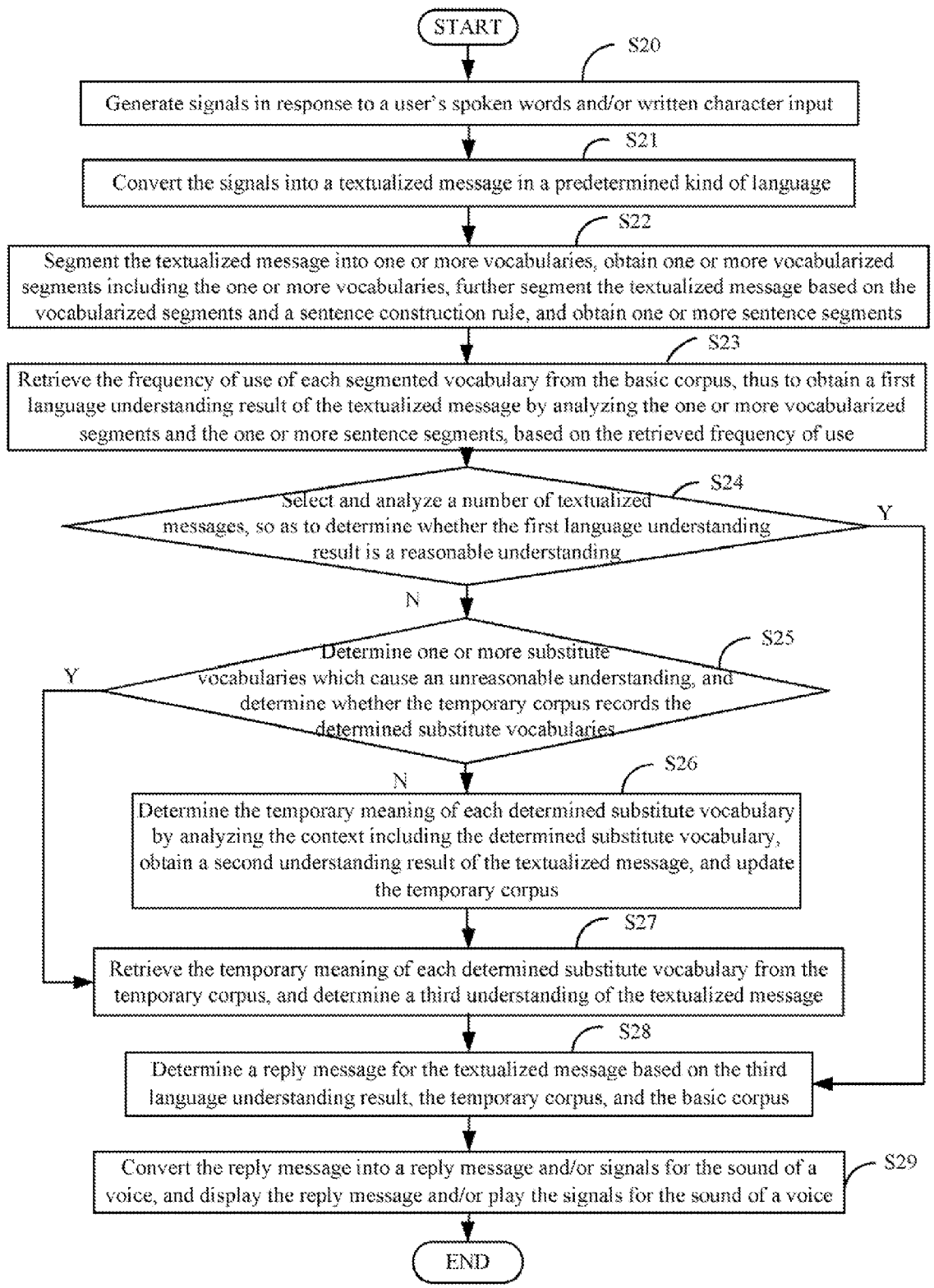
FIG. 2 is a flowchart of a natural language analysis method for electronic devices, such as the one of FIG. 1, in accordance with the exemplary embodiment.

FIG. 2 shows a flowchart of a natural language analysis method for the electronic device 100 of FIG. 1. The electronic device 100 stores a basic corpus 11 recording a vast amount of vocabularies: words and phrases, and the frequency of use of each word and each phrase. The method includes the following steps, each of which is related to the various components contained in the electronic device 100.

In step S20, the input unit 20 generates signals in response to a user's spoken words and/or written character input. In the embodiment, the signals can be audio signals and/or character signals.

In step S21, the voice and character converting module 31 converts the signals from the input unit 20 into a textualized message in a predetermined language. In the embodiment, the textualized message can include a word, a phrase, a sentence, and/or a paragraph of a text, and the predetermined language is Chinese.

In step S22, the language analysis module 32 segments the textualized message into one or more vocabularies, obtains one or more vocabularized segments including the one or more vocabularies, further segments the textualized message based on the vocabularized segments and a sentence construction rule, and obtains one or more sentence segments.

In step S23, the language analysis module 32 retrieves the frequency of use of each segmented vocabulary, from the basic corpus 11, thus to obtain a first language understanding result of the textualized message by analyzing the one or more vocabularized segments and the one or more sentence segments, based on the retrieved frequency of use of each segmented vocabulary.

In step S24, the determination module 33 selects and analyzes a number of textualized messages converted within a predetermined time period, including the original textualized message which is segmented by the language analysis module 32, using a contextual understanding method, so as to determine whether the first language understanding result is a reasonable understanding. If no, the process goes to step S25, otherwise, the process goes to step S28.

In step S25, the language analysis module 32 determines one or more vocabularies (substitute vocabularies) which cause an unreasonable understanding, compares the determined substitute vocabularies with any substitute vocabularies recorded in the temporary corpus 41 to determine whether the temporary corpus 41 does record the determined substitute vocabularies. If no, the process goes to step S26, otherwise, the process goes to step S27. In an embodiment, when both the buffer 40 and the storage unit 10 do not have a temporary corpus 41, the language analysis module 32 further creates a temporary corpus 41 and stores the mapping relationship between the determined substitute vocabularies and the temporary meaning in the created temporary corpus 41.

In step S26, if the temporary corpus 41 does not have a record of one or more of the determined substitute vocabularies, the language analysis module 32 determines the temporary meaning of each determined substitute vocabulary by analyzing the context including the determined substitute vocabulary, obtains a second understanding result of the textualized message, and updates the temporary corpus 41 by storing the mapping relationship between the determined substitute vocabularies and the temporary meaning therein.

In step S27, if the temporary corpus 41 does have a record of all of the determined substitute vocabularies, the language analysis module 32 retrieves the temporary meaning of each determined substitute vocabulary from the temporary corpus 41, and determines a third understanding of the textualized message.

In step S28, the intelligent conversation module 34 determines a reply message for the textualized message based on the third language understanding result, the temporary corpus 41, and the basic corpus 11. In an embodiment, the determination module 33 further deletes the temporary corpus 41 stored in the buffer 40 and/or the storage unit 10, when the current human-machine dialogue between the electronic device 100 and the user is over.

In step S29, the voice and character converting module 31 converts the reply message determined by the intelligent conversation module 36 into a reply message and/or signals for the sound of a voice, and controls the display unit 50 to display the reply textualized message and/or the audio output unit 60 to play the sound of a voice.

The electronic device 100 has a better ability to understand the meanings of user's language, and a translation of any speech by the user to the electronic device 100 is more efficient.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A natural language analysis method for an electronic device storing a basic corpus and a temporary corpus, the basic corpus recording a vast amount of vocabularies, words and phrases and a frequency of use of each word and each phrase, the temporary corpus recording the mapping relationship between at least one substitute vocabulary and at least one temporary meaning, the method comprising:
   generating signals in response to a user's input;
   converting the signals into a textualized message in a predetermined language;
   segmenting the textualized message into at least one vocabulary, and obtaining at least one vocabularized segment comprising the at least one vocabulary;
   segmenting the textualized message based on the vocabularized segments and a sentence construction rule, and obtaining at least one sentence segment;
   retrieving the frequency of use of each segmented vocabulary from the basic corpus, obtaining a first language understanding result of the textualized message by analyzing the at least one vocabularized segments and the at least one sentence segments, based on the retrieved frequency of use of each segmented vocabulary;
   selecting a plurality of textualized messages consecutively converted within a predetermined time period, the selected textualized messages including said textualized message which is segmented in the segmenting step;
   analyzing of the selected textualized messages using a contextual understanding method, so as to determine whether the first language understanding result is a reasonable understanding;
   if the first language understanding result is an unreasonable understanding, determining at least one substitute vocabulary causing the unreasonable understanding, determining whether the temporary corpus records the determined at least one substitute vocabulary;
   if the temporary corpus does not have a record of one or more of the determined at least one substitute vocabulary, determining temporary meaning of each determined substitute vocabulary by analyzing the context comprising the determined substitute vocabulary to obtain a second understanding result of the textualized message, and updating the temporary corpus by storing the mapping relationship between the determined at least one substitute vocabulary and the temporary meaning therein; and
   determining a reply message for the textualized message based on a reasonable language understanding result, the temporary corpus, and the basic corpus.

2. The method as described in claim 1, further comprising:
   converting the reply message into a reply message; and
   displaying the converted reply message.

3. The method as described in claim 1, further comprising:
   converting the reply message into signals for the sound of a voice; and
   playing the signals for the sound of a voice.

4. The method as described in claim 1, further comprising:
   creating a new temporary corpus and storing a mapping relationship between the determined substitute vocabularies and the temporary meaning in the created new temporary corpus.

5. The method as described in claim 1, further comprising:
   if the first language understanding result is an unreasonable understanding and the temporary corpus records all of the least one substitute vocabulary, retrieving temporary meaning of each determined substitute vocabulary from the temporary corpus;
   determining a third understanding of the textualized message; and
   determining a reply message for the textualized message based on the third language understanding result, the temporary corpus, and the basic corpus.

6. The method as described in claim 1, further comprising:
   determining whether current conversation between the electronic device and the user is over; and
   deleting the temporary corpus when the current conversation is over.

7. The method as described in claim 1, wherein the predetermined language is Chinese or English.

8. The method as described in claim 1, wherein the basic corpus is a text database which is machine readable and is collected according to a given design criterium.

9. The method as described in claim 1, wherein the user input is a voice input or a written character input.

10. The method as described in claim 1, wherein the textualized message is selected from the group consisting of: at least one word, at least one phrase, at least one sentence, and at least one paragraph of a text.

11. An electronic device comprising:
    a storage unit, storing a basic corpus and a temporary corpus, the basic corpus recording a vast amount of vocabularies, words and phrases and the frequency of use of each word and each phrase, the temporary corpus recording the mapping relationship between at least one substitute vocabulary and at least one temporary meaning;
    an input unit, configured for generating signals in response to a user's input;
    a voice and character converting module, configured for converting the signals into a textualized message in a predetermined language;
    a language analysis module, configure for segmenting the textualized message into at least one vocabulary, obtaining at least one vocabularized segment comprising the at least one vocabulary, segmenting the textualized message based on the vocabularized segments and a sentence construction rule, obtaining at least one sentence segment, retrieving the frequency of use of each segmented vocabulary from the basic corpus, obtaining a first language understanding result of the textualized message by analyzing the at least one vocabularized segments and the at least one sentence segments, based on the retrieved frequency of use of each segmented vocabulary;
    a determination module, configured for selecting a plurality of textualized messages consecutively converted within a predetermined time period, the selected textualized messages including said textualized message segmented by the language analysis module and analyzing the selected textualized messages, using a contextual understanding method, so as to determine whether the first language understanding result is a reasonable understanding, determining at least one substitute vocabulary causing the unreasonable understanding, and determining whether the temporary corpus records the determined at least one substitute vocabulary; and an intelligent conversation module, configured for determining a reply message based on a reasonable language understanding result, the temporary corpus, and the basic corpus;

wherein the language analysis module is further configured for determining temporary meaning of each determined substitute vocabulary not recorded in the temporary corpus by analyzing the context comprising the determined substitute vocabulary to obtain a second understanding result of the textualized message, and updating the temporary corpus by storing the mapping relationship between the determined at least one substitute vocabulary and the temporary meaning therein.

12. The electronic device as described in claim 11, wherein the voice and character converting module is further configured for converting the reply message into a reply message or signals for the sound of a voice.

13. The electronic device as described in claim 12, further comprising a display unit configured for displaying the converted reply message.

14. The electronic device as described in claim 12, further comprising an audio output unit configured for playing the signals for the sound of a voice.

15. The electronic device as described in claim 11, wherein the language analysis module is further configured for creating a new temporary corpus and storing a mapping relationship between the determined substitute vocabularies and the temporary meaning in the created new temporary corpus.

16. The electronic device as described in claim 11, wherein if the first language understanding result is an unreasonable understanding and the temporary corpus records all of the least one substitute vocabulary, the language analysis module is further configured for retrieving temporary meaning of each determined substitute vocabulary from the temporary corpus, and determining a third understanding of the textualized message accordingly, and the intelligent conversation module is further configure for determining a reply message for the textualized message based on the third language understanding result, the temporary corpus, and the basic corpus.

17. The electronic device as described in claim 11, wherein the determination module is further configured for determining whether current conversation between the electronic device and the user is over, and deleting the temporary corpus when the current conversation is over.

18. The electronic device as described in claim 11, wherein the basic corpus is a text database which is machine readable and is collected according to a given design criterium, and the predetermined language is Chinese or English.

19. The electronic device as described in claim 11, wherein the user input is a voice input or a written character input.

20. The electronic device as described in claim 11, wherein the textualized message is selected from the group consisting of: at least one word, at least one phrase, at least one sentence, and at least one paragraph of a text.

* * * * *